United States Patent

Mee

[15] 3,662,361

[45] May 9, 1972

[54] MAGNETIC HEAD WITH DEPOSITED CORE AND SIGNAL CONDUCTOR

[72] Inventor: C. Dennis Mee, Los Gatos, Calif.

[73] Assignee: International Business Machines Corporation, Armonk, N.Y.

[22] Filed: Feb. 13, 1968

[21] Appl. No.: 705,062

[52] U.S. Cl...............340/174.1 F, 179/100.2 C, 346/74 MC

[51] Int. Cl...............G11b 5/20, G11b 5/16

[58] Field of Search..............340/174.1 F, 174 TF; 179/100.2 C, 100.2 CF, 100.2 CH, 100.2 CB; 346/74 MC

[56] References Cited

UNITED STATES PATENTS 3,521,258 7/1970 Hurr, Jr. ..............340/174.1 F 3,344,237 9/1967 Gregg..............179/100.2 C 3,495,230 2/1970 Best..............179/100.2 C 3,271,751 9/1966 Proebster..............340/174.1

3,456,250 7/1969 Barcaro et al. ..............340/174.1

*Primary Examiner*—Bernard Konick

*Assistant Examiner*—Vincent P. Canney

*Attorney*—Hanifin and Jancin and Gerald L. Moore

[57] ABSTRACT

A head for use in magnetic recording made up of a plurality of transducer elements with each element comprising a series of overlapping films forming magnetic transducers connected by conductors in a matrix configuration such that any one of the elements can be selected for use.

12 Claims, 9 Drawing Figures

INVENTOR.
C. DENIS MEE

BY Gerald L. Moore
ATTORNEY

MAGNETIC HEAD WITH DEPOSITED CORE AND SIGNAL CONDUCTOR

BACKGROUND OF THE INVENTION

1. Field of the Invention

This invention relates to magnetic transducing heads and, more specifically, to a head comprising a plurality of elements individually selectable for use.

2. Description of the Prior Art

In the field of magnetic recording of data onto movable storage media, the trend is towards increasing the number of active head elements to decrease the access time and increase the data storage capacity of the system. The access time refers primarily to that time differential between the receiving of a signal indicating the need to use a selected head and the time it is ready for usage. Generally, the positioning of a head in alignment with the desired recorded data or the position on the medium on which data is to be recorded takes the most time. By providing more transducing elements positioned closer together, less transverse movement of each element is necessary to gain the necessary alignment with the medium for reading or writing selected lines of data.

Other trends towards increasing the memory capacity of data systems involves recording on a storage medium at a much higher density and frequency. To accomplish this the transducing element just be smaller and be positioned much closer to the medium. The manufacturing of such small heads capable of reacting to higher frequency signals presents many problems not faced in the making of conventional assemblies.

In either case, with the use of a plurality of transducing elements, an inexpensive means is needed to select the element desired to be used. One approach to making such a selection means inexpensive is to use as little electronic circuitry as possible. A continuing requirement is that the switching means must act quickly in response to a selection signal so the access time for the head is held to a minimum.

Concerning the prior art, some previous attempts at making multiple element heads have been published. For instance, U.S. Pat. No. 2,901,549 issued on Aug. 25, 1959 and entitled "Magnetic Recording System" discloses a magnetic recording system utilizing a plurality of transducers which can be individually energized for recording purposes. However, this patent is characteristic of much of the prior art in not attempting to suggest a practical method for making a high density recording head embodying the principles taught.

With the necessity for using much smaller transducing elements as well as for incorporating a multiplicity of elements in a single head, it has now become desirable to fabricate the head as one package rather than fabricating the elements separately before assembly. This becomes even more necessary with the present trend towards making the elements smaller to meet the demands of the high capacity system. However, in making the heads smaller, durability and reliability cannot be compromised.

Thus, it is an object of this invention to provide an improved magnetic transducing element which is small in size and more reliable in operation due primarily to the simplicity in configuration and assembly.

A further object of this invention is to provide a matrix head uniquely fabricated of a plurality of separate transducing elements, with each element being separately energizable for reading or writing while using less electronic circuitry and having a minimum interaction between the elements.

Still another object of this invention is to provide a matrix head comprised of a plurality of thin-film transducing elements, which elements can be individually selected for the reading and writing of data stored magnetically on a storage medium at high frequencies.

SUMMARY OF THE INVENTION

A magnetic head comprised of a plurality of individual thin-film transducing elements with each element including a signal conductor in magnetic relationship with a single turn magnetic core forming gap for reacting magnetically with the storage media, and a separate control conductor for blocking the response of the element to an input signal transmitted along the signal conductor.

The foregoing and other features and the advantages of the invention will be apparent from the following more particular description of the preferred embodiment of the invention, as illustrated in the accompanying drawings.

DESCRIPTION OF A PREFERRED EMBODIMENT

Figure 1:
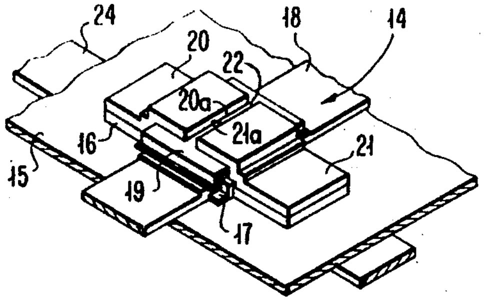
FIG. 1 is a perspective view of one thin-film transducing element of the magnetic head.
Figure 2:
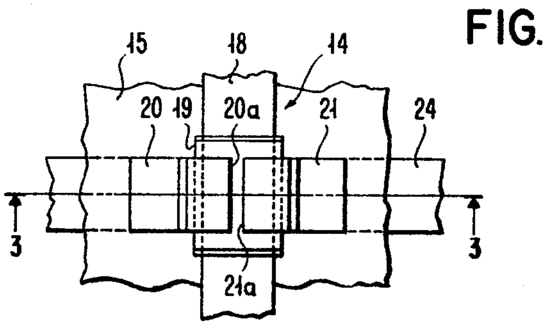
FIG. 2 is a plan view of the element of FIG. 1.
Figure 3:
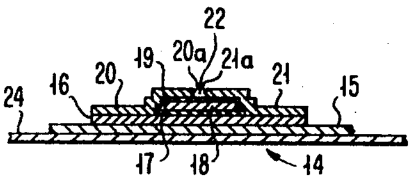
FIG. 3 is a cross-sectional view along the line 3—3 of FIG. 2.

In the figures are shown a preferred embodiment of the invention comprising a magnetic recording head matrix 10 (FIG. 4) for reading and writing information stored magnetically on a storage medium 11 along data tracks 12. In the embodiment shown, the head is comprised of a plurality of individual transducer elements 14 (FIGS. 1–4) supported on an insulating substrate 15 providing structural rigidity to the head.

Figure 5A:
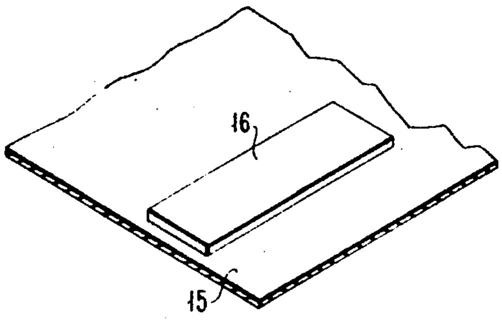
FIGS. 5A through 5E show the step-by-step process for making a magnetic transducing element.
Figure 5D:
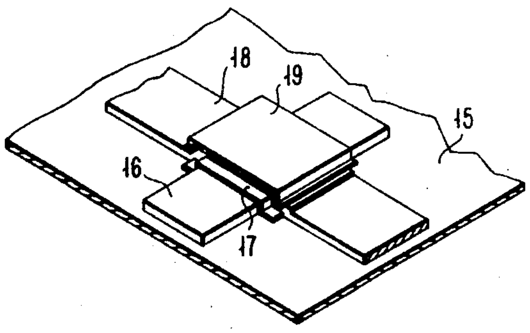
Figure 5B:
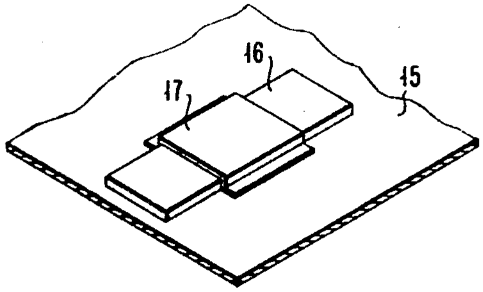
Figure 5E:
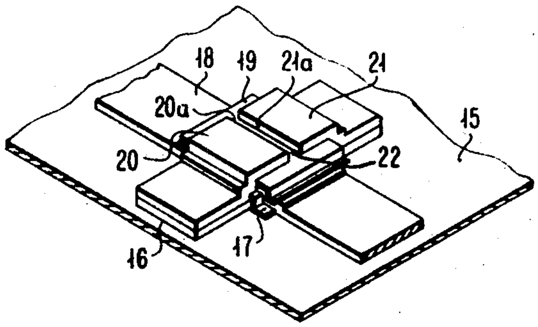
Figure 5C:
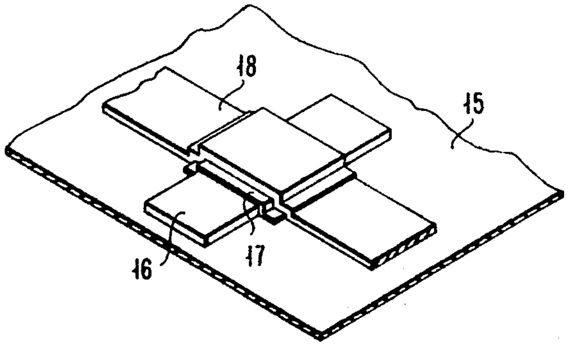

To fabricate the head shown, a plurality of the identical individual transducer elements are formed of several consecutively deposited thin films as shown in the various views of FIGS. 5A through 5E. To fabricate each element, there is formed a layer 16 of magnetic material such as a nickel iron alloy, i.e., a permalloy, directly on the insulating substrate 15 of a magnetic material (preferably evaporated in place) as shown in FIG. 5A. Thereafter, an insulating portion 17 (FIG. 5B) is formed overlaying the center portion of the layer 16. This layer can be formed of any suitable insulating material such as silicon dioxide. The insulating layer 17 extends across the magnetic material 16 and beyond the edges thereof as shown. Thereafter, a data signal conductor 18 (FIG. 5C) is formed of a conductive material such as copper in a position extending across the layer 16 in contact only with the insulating layer 17 and the substrate so as to be electrically insulated from the layer 16. This signal conductor is extended along the substrate and across several individually deposited layers 16 and 17 of each adjacent element, with each cooperating layer deposit determining a position of an independently usable transducer element.

After the signal conductor 18 is formed, a second insulating layer 19 (FIG. 5D) is deposited thereover in a position overlapping with the initial insulating layer 17 so as to completely envelope the center portion of each conductor 18. Thereafter, a pair of magnetic material elements 20 and 21 (FIG. 5E) also of a nickel iron alloy are deposited of a single layer overlying the insulating layer 19 and in direct contact with the other magnetic layer 16 at the outer extending ends so as to form therewith a single turn magnetic path or core extending substantially around the conductor 18. The ends **20*a* and 21*a* are juxtapositioned to form the gap 22 of the transducer element. A control conductor 24 (FIG. 1) now is formed on the opposite side of the substrate 15 extending in a direction perpendicular to the conductor 18 and in alignment with the magnetic layer 16**.

Figure 4:
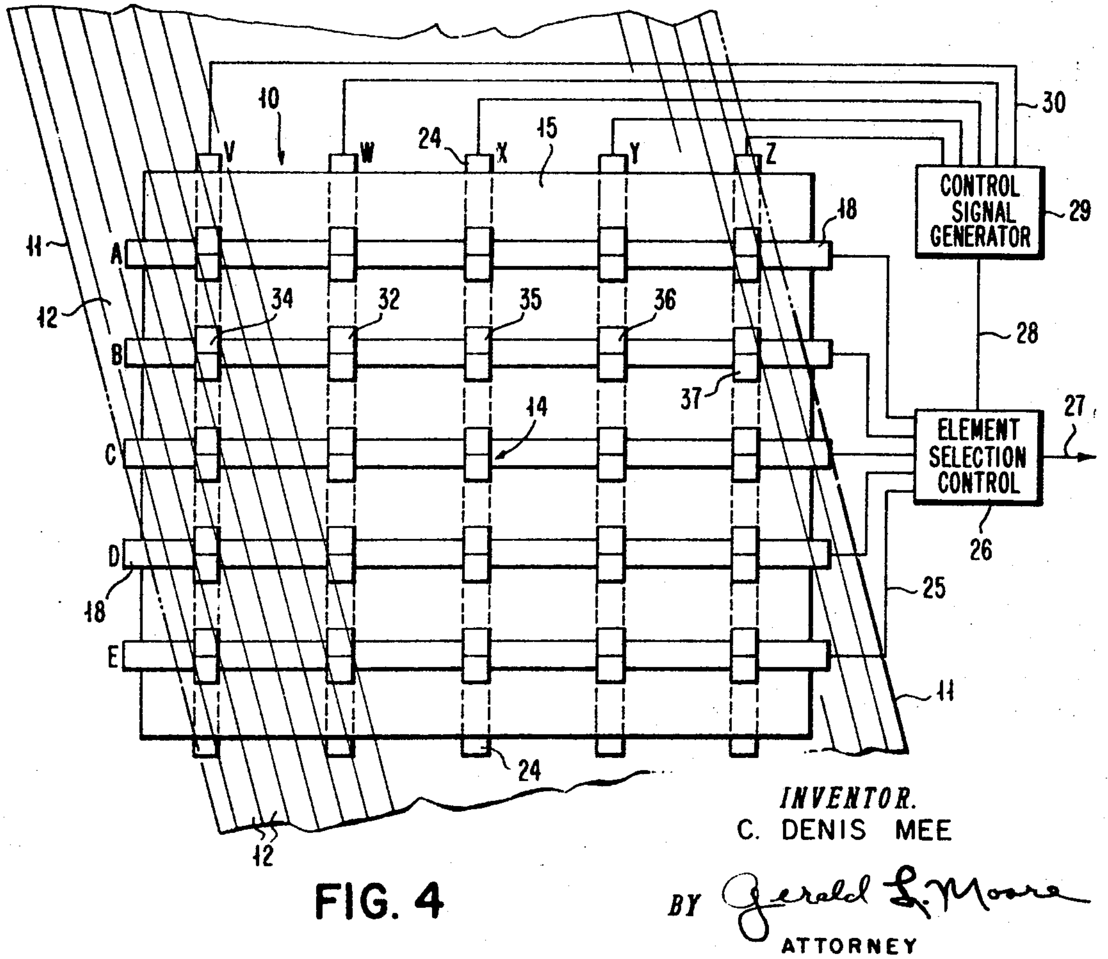
FIG. 4 is a top plan view of a magnetic head showing the matrix configuration of the connecting conductors with the associated circuitry in schematic form for selecting the transducing element to be used.

In the example shown in FIG. 4, there are supported 25 individual transducer elements on a planar matrix of rows of data signal conductors lettered A, B, C, D, and E, and columns of control conductors V, W, X, Y, and Z. Of course, any number of elements can be formed depending on the need and the physical size of the substrate 15. The signal conductors are connected by individual circuit conductors 25 to an element selection control 26, which in turn connects through a conductor 27 to a suitable data source, not shown. Connecting also with the element selection control 26 through conductor 28, is a control signal generator 29, which in turn is in contact through individual conductors 30 with the control conductors V, W, X, Y, and Z.

By forming the elements in the manner of depositing thin films in place on the substrate 15, a magnetic head comprising a plurality of transducing elements can be manufactured in the precision manner described. It is desirable to make the individual layers by the deposition of thin films of the order of a few microinches thickness to reduce the head size. For instance, a typical head is made of a conductor 18 having a thickness of 200 microinches, insulating layers 4 microinches thickness, and magnetic layers 16, 20 and 21 of 80 microinches thickness forming an airgap 22 of 80 microinches. The use of such thin films in the element increases the usable frequency range of the head since eddy currents within the head are minimized.

To explain the operation of the magnetic transducer, the magnetic head is positioned during use in close proximity to the storage medium 11. For instance, the surface 31 of the head in FIG. 4 is positioned sufficiently close so the gap 22 will extend into the magnetic field region of the media. Thus, recording of data is accomplished by feeding a current signal into the data signal conductor 18, which current causes a magnetic field to be formed within the magnetic core comprising the magnetic layers 16, 20, and 21. The magnetic field in extending across the gap 22 penetrates the medium to magnetically align the penetrated portion in response to the data signal.

For reading information, the medium in being magnetized in a specified way to indicate data, sets up a magnetic field which, when intersected by the gap 22 formed by the magnetic layers 20 and 21, extends around the magnetic path comprising the magnetic layers 20, 16, and 21. With relative movement between the head and the media, a flux change is effected through the magnetic path cutting the conductor 18 and causing the generation of an electric current therein in response to the recorded data. By detecting this electric current, the data can be read.

In accordance with the invention, any one of the transducer elements within the matrix of the head shown in FIG. 4 can be selected for reading or writing. To accomplish the selection of one element only for writing, the data signal is transmitted along the data conductor including the transducing element desired to be used while the other elements of the conductor are prevented from reacting to the signal. For instance, if it is desired to write with the transducer element 32 positioned at the intersection of the data signal conductor B and the control signal conductor W. it can be seen that the necessary transmission of the data signal along the conductor B will not only energize the transducer 32 but will, additionally, energize the other four transducer elements 34, 35, 36, and 37 similarly associated with that conductor. Thus, it is necessary to prevent the other heads of that row from reacting to the data signal since they also are positioned adjacent the storage medium and will record the data also along the data tracks adjacent thereto.

To inactivate selected heads of a data conductor not to be used at that time, the control conductors are positioned in magnetic association with the transducer elements positioned in columns extending normal to the elements associated with the data signal conductors. The control conductors are positioned in parallel alignment and magnetic association with the magnetic layers 16, separated only by the thickness of the insulating substrate 15. It is apparent that since the conductor and layers are in magnetic association, the supplying of an electric current through the conductor will result in a magnetic field intersecting the magnetic layer of all the transducer elements positioned adjacent that conductor. It has been found that by passing a steady current of approximately 300 milliamperes through the conductor 24, the field surrounding that conductor is sufficient to saturate a portion of the layer 16 of those transducers adjacent the conductor. The saturated area however, does not affect the magnetic alignment of the adjacent memory element since the field extends crosswise the layer 16 and zero field exists across the recording gap. By passing this control current through the selected conductors 24, a significant flux change due to the signal flux in the magnetic cores of the transducer elements, including the layers 16 which are saturated, is prevented by the high reluctance created. In this manner, those saturated elements are incapacitated from reacting to a data signal transmitted through their associated signal conductor.

For reading, the elements are selected by amplifying the signal of the element desired through use of the matrix conductors. The signal of the selected element is amplified by applying to the associated control conductor, a current signal having a frequency considerably higher than the normal frequency of the data signal. Thus a cross flux is alternately set up and allowed to decay in the head in the manner previously described, which acts as an alternating high impedance to the signal flux, thus causing an enhanced control signal to be generated in the signal conductor. For instance, if it is desired to read data stored on the media by use of the element 32, the high frequency control signal is passed through the conductor W. Thus, a flux change effected in the element 32 by the recorded data track causes a current flow within the conductor B, which current flow is sensed at the element selection control 26 and conducted on through the conductor 27 to the point of use. To enhance the output signal of head 32 in row B so only that signal of the heads of that row is read, the rapidly changing signal of several times (preferably ten times or more) the frequency of the write signal is passed through the conductor W which sets up a repetitive saturating flux change within the selected element 32. This flux change thereby causes a change in the flux of the element 32 caused by the storage medium with the phase of changing flux being determined by the magnetic field resulting from data signal recorded. Thus, a higher rate of change of flux is effected thereby resulting in much higher signal output detected within the data signal conductor B resulting from the element 32. While a signal is also generated by the other elements 34, 35 and 36, the amplitude is sufficiently low since the output signal isn't enhanced so as not to strongly affect the detection of the signal from the element 32.

In accordance with another feature of the invention, the head elements are located in a matrix configuration and positioned to overlie separate data track areas of the storage medium, and can be individually selected for use in the manner previously described for reading and writing on their associated data tracks. By positioning the matrix with a major axis at an angle other than normal to the recording media 11, each element is adjacent separate areas of the storage medium. Thus, with relative movement between the head and medium, reading and writing on separate data tracks is affected by each head element as illustrated by the lines 12. Any number of heads can be positioned in the matrix and controlled in the manner previously described to cover larger areas of the medium as desired. Thus, a greater head separation is achieved for writing on closely positioned data tracks with a minimum of interaction between the heads due to the lateral spacing therebetween.

While the invention has been particularly shown and described with reference to a preferred embodiment thereof, it will be understood by those skilled in the art that various changes in the form and details may be made therein without departing from the spirit and scope of the invention.

What is claimed is:

1. A magnetic head element to provide a transducing action with a movable storage medium adjacent thereto, said head comprising:

an insulating member;

a signal conductor comprising a thin film of a deposited conducting material supported on said insulating member;

a magnetic core comprising a first thin film of magnetic material deposited on and supported by one surface of said insulating member beneath said signal conductor and a second thin film of magnetic material deposited on said first film and said signal conductor and extended over said signal conductor with both said thin films extending past and joined beyond the edges of said signal conductor, said second film having a gap therethrough that is accurately located with reference to said one surface of said insulating member and above said signal conductor whereby said deposited core substantially encircles said signal conductor but for said gap in said second film, whereby reading or writing of information on said magnetic medium will result through an interaction between the magnetic field across said air gap and said storage medium with a concurrent change in current flow occurring in said signal conductor; and a control conductor positioned in magnetic field association with said core whereby passage of an electric current through the control conductor will cause a cross field saturating at least a portion of said core to prevent a change in the magnetic flux across said gap when there is a change in the current flow in said signal conductor during the writing process; and to produce a change in the magnetic flux through the core memory during the reading process.

2. A magnetic head element as defined in claim 1 wherein said control conductor is comprised of a thin film of conductor material deposited on the side of said insulating member disposed away from said magnetic core.

3. A magnetic head element as defined in claim 1 including an insulating layer positioned between said signal conductor and said first and second thin films.

4. The magnetic head element as set forth in claim 1, wherein said second film and said gap each has a thickness of approximately 80 microinches.

5. A magnetic head to provide a transducing action with a movable storage medium adjacent thereto, said head comprising;

an insulating member;

a plurality of deposited thin film signal conductors supported on one side of said insulating member and extended generally in the same direction;

a plurality of magnetic cores positioned along each signal conductor, each of said cores comprising a first thin film of magnetic material deposited on and supported by one surface of said insulating member beneath one of said signal conductors and a second thin film of magnetic material deposited on said first film and said signal conductor and extended over said signal conductor with both said thin films extending past and joined beyond the edges of said signal conductor, said second film having a gap therethrough that is accurately located with reference to said one surface of said insulating member and above said signal conductor whereby said deposited core substantially encircles said conductor;

whereby reading and writing of information on said magnetic medium will result through an interaction between a change in the magnetic field across said gap and the storage medium with a concurrent change in current flow in said signal conductor; and a plurality of control conductors each positioned in magnetic field association with one or more of said cores whereby the passage of an electric current through the control signal conductor will result in a magnetic field intercepting said core and causing a saturating flux extending in a direction other than across said gap to prevent a change in a magnetic field across the gap when a change in current flow through the signal conductor is effected during the writing process; and to produce a change in the magnetic flux through the core during the reading process.

6. A magnetic head as defined in claim 5 wherein said cores are positioned in a matrix configuration each at the intersection of a control conductor and a signal conductor.

7. A magnetic head as defined in claim 5 wherein said control conductors comprise a thin film conductor deposited on the side of said insulating member disposed away from said magnetic core.

8. A magnetic head as defined in claim 5 including means to provide a rapidly changing current through a selected control conductor whereby data stored on the storage medium adjacent the selected core can be read by virtue of the rapid data flux change in said core, caused by said rapidly changing control current and said storage medium.

9. The magnetic head as set forth in claim 5, wherein said second film and said gap each has a thickness of approximately 80 microinches.

10. A magnetic head to provide a transducing action with a movable storage medium adjacent thereto, said head comprising:

an insulating member;

a plurality of deposited thin film signal conductors supported on one side of said insulating member and extended generally in the same direction; and a plurality of magnetic cores positioned along each signal conductor, each of said cores comprising a first thin film of magnetic material deposited on and supported by one surface of said insulating member beneath one of said signal conductors and a second thin film of magnetic material deposited on said first film and said signal conductor and extended over said signal conductor with both said thin films extending past and joined beyond the edges of said signal conductor, said second film having a gap therethrough that is accurately located with reference to said one surface of said insulating member and above said signal conductor whereby said deposited core substantially encircles said conductor, whereby reading and writing of information on said magnetic medium will result through an interaction between a change in the magnetic field across said gap and the storage medium with a concurrent change in current flow in said signal conductor.

11. The method of forming a magnetic head on a insulating member comprising the steps of:

forming a first film member of magnetic material on a selected portion of said insulating member;

forming a signal conductor of electrically conductive material extending in a first plane along the insulating member and extending in a second plane which is parallel to said first plane across said first film member;

forming a second film member of magnetic material extending in a third plane across said signal conductor and having the ends thereof in contact with opposite ends of said first film member and including a gap whereby said first and second film members form a single closed core member encircling said signal conductor; and forming a control conductor of electrically conductive material extending along the insulating member in magnetic field association with a portion of said core member.

12. The method of forming a magnetic head as defined in claim 11 wherein said first and second film members are comprised of a nickel-iron alloy.

* * * * *